(12) United States Patent
Segel

(10) Patent No.: US 7,697,557 B2
(45) Date of Patent: Apr. 13, 2010

(54) PREDICTIVE CACHING CONTENT DISTRIBUTION NETWORK

(75) Inventor: Jonathan Segel, Ottawa (CA)

(73) Assignee: Alcatel Lucent, Paris (FR)

( * ) Notice: Subject to any disclaimer, the term of this patent is extended or adjusted under 35 U.S.C. 154(b) by 200 days.

(21) Appl. No.: 12/003,469

(22) Filed: Dec. 26, 2007

(65) Prior Publication Data

US 2009/0168795 A1  Jul. 2, 2009

(51) Int. Cl.
  *H04L 12/54* (2006.01)
(52) U.S. Cl. ...................................................... 370/429
(58) Field of Classification Search .................. None
  See application file for complete search history.

(56) References Cited

U.S. PATENT DOCUMENTS

| | | | | |
|---|---|---|---|---|
| 6,098,096 | A * | 8/2000 | Tsirigotis et al. | 709/213 |
| 6,341,304 | B1 | 1/2002 | Engbersen | |
| 6,356,283 | B1 * | 3/2002 | Guedalia | 715/760 |
| 7,113,962 | B1 * | 9/2006 | Kee et al. | 707/201 |
| 2002/0091792 | A1 * | 7/2002 | Janniello et al. | 709/217 |
| 2003/0217113 | A1 | 11/2003 | Katz et al. | |
| 2007/0183441 | A1 * | 8/2007 | Medin | 370/429 |

FOREIGN PATENT DOCUMENTS

EP       1400900 A    3/2004

* cited by examiner

*Primary Examiner*—Chirag G Shah
*Assistant Examiner*—Otis L Thompson, Jr.
(74) *Attorney, Agent, or Firm*—Kramer & Amado, P.C.

(57) ABSTRACT

In various exemplary embodiments, a method for the distribution of content within a network of constrained capacity uses distributed content storage nodes functioning to achieve optimal service quality and maximum service session capacity. The method, which functions in unicast, broadcast, switched broadcast, and multicast mode networks, uses predictions of the utility of particular content items to download or record the highest utility items to distributed content stores during periods and in modes that will not increase demand peaks. These predictions of utility may be based on, for example, the number of potential users, the likelihood of their use, and the value to the service provider. The method uses signaling between network nodes to identify the best source for particular content items based on which nodes hold that content and the nature of network constraints.

23 Claims, 7 Drawing Sheets

PREDICTIVE CACHING CONTENT DISTRIBUTION NETWORK

BACKGROUND OF THE INVENTION

1. Field of the Invention

This invention relates generally to caching or temporary storage of information in one or more nodes of a content distribution network.

2. Description of Related Art

With the continued expansion of broadband Internet, the number of users seeking real-time delivery of multimedia content is constantly increasing. A content distribution network addresses this need by delivering digital content to end-users via a system of networked computers or nodes with the capability to cache content items. By harnessing geographically-dispersed storage, content distribution networks provide users with access to large amounts of content at high quality.

There are generally two reasons for constructing a network optimized for the distribution of content. A first objective is to improve the quality of the user experience through higher bandwidth and reduced latency and jitter. A second objective is to optimize the profitability of the network service.

In general, the profitability of a network service is driven by average utilization, while the cost is driven by the as-built network capacity, which is sized to meet peak traffic loads. When demand for content approaches the available network capacity, the service provider is unable to deliver more service sessions, thereby reducing revenue and service quality. This reduction in service quality can also decrease the price of the service or necessitate an expensive augmentation of network capacity.

A common technique for decreasing costs in a network is to shift traffic demand into off-peak periods to defer network expansion and avoid network congestion. Networks incorporating storage can smooth out the demand profile to eliminate peaks. These networks can enable greater service capacity, while minimizing the costs of implementing the content distribution network.

The hierarchical tiering of content stores is well established. In hierarchical tiering systems, when a user requests a piece of multimedia content, such as video or audio, the content distribution network maximizes efficiency by selecting the closest server measured in terms of network proximity. For example, the content distribution network may attempt to minimize the number of hops or network latency between the requesting node and the server node. Inefficiencies in the content distribution network can arise, however, if the content requested by the user is not available on a server node located in close proximity to the requesting node. In these situations, the server node must retrieve the content from another node, thereby placing increased traffic demands on the content distribution network as a whole.

Although many current content distribution networks achieve the objective of improving end-user performance, they can also result in increased costs to the network service provider by replicating and distributing content that is not used or by distributing it during peak periods. Current content distribution networks do not factor knowledge of network utilization or free capacity into the decisions about what content to cache, how much to cache, or when to re-populate the cache.

All caching in content distribution networks is based on the premise that the content stored in the cache will be used, but current implementations decide what content to cache assuming that a content item that has been used once will be used again or that a content item that was of interest to one user will be of interest to other users. These implementations only directly and in a very simplistic fashion attempt to predict future content consumption, for example, by tracking past content consumption to decide which past consumption items should be retained in the cache.

This simplistic process for deciding what content to cache may fail for a number of reasons. For example, a recently released movie might be expected to have many viewers in the future, but no viewers in the past. Accordingly, existing content distribution networks would generally fail to store such content. Conversely, most content distribution networks would not be able to determine that content that was popular in the past will not be popular in the future. For example, special coverage of an election that would be of widespread interest during the election would likely be of little or no interest once the election has passed.

As another example, a Cambodian woman who happens to be the only Cambodian living in a content distribution network local serving area might regularly request Cambodian language content. However, there is little utility in caching the items delivered to her because her content will not be of interest to neighboring users and she will likely not want to watch content she has seen before. Existing content distribution networks would generally fail to realize that her unique viewing patterns make caching of the content destined for her unhelpful.

Furthermore, even when existing content distribution networks correctly identify a content item that is likely to be frequently used in the future, these networks might send the item to a distributed storage point during a period of peak usage, thereby adding to the capacity shortage. In addition, existing content distribution networks generally operate with a single networking mode. As a result, these networks might request a unicast download of a movie to a distributed caching point even when it is possible to avoid the added network load of a unicast download by recording the movie from a broadcast network at the distributed caching point.

Accordingly, there is a need for a predictive caching content distribution network that reduces costs by using predictive knowledge of future content consumption to automatically cache content during off-peak periods or to capture content from a broadcast network when it is transmitted. In addition, there is a need for a self-adapting content distribution network that utilizes caching to maintain an inventory of content that is most likely to suit the current interests of users. There is also a need for caching selected content to shift demand peak within the content distribution network and thereby maximize the number of service sessions that can be delivered at a given network link capacity.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations and improvements herein shown and described in various exemplary embodiments.

SUMMARY OF THE INVENTION

In light of the present need for a predictive caching content distribution network, a brief summary of various exemplary embodiments is presented. Some simplifications and omissions may be made in the following summary, which is intended to highlight and introduce some aspects of the various exemplary embodiments, but not to limit its scope. Detailed descriptions of a preferred exemplary embodiment adequate to allow those of ordinary skill in the art to make and use the invention concepts will follow in later sections.

In various current embodiments, a content distribution network is arranged in a hierarchy of nodes by network proximity. Thus, in these networks, a node downloads content from a distant node only when a closer copy of the content is unavailable. To minimize the need to obtain a content item from a more distant node in the hierarchy, the content distribution network shifts traffic from peak periods to off-peak periods by caching a content item locally.

In various current embodiments, the content distribution network utilizes flow-through caching to save a copy of a content item that "flows through" an intermediate node. Nodes maintain copies of content sent through the node until the content is not accessed for a predetermined period of time, at which point the node drops the content from the cache. Although these embodiments are simple to administer and do not generate any additional network traffic, they are only useful for reducing load on subsequent requests and not the first request for a given content item.

In various current embodiments, the content distribution network instead utilizes predictive pre-fetching to cache content items based on the current item viewed by the user. While these embodiments improve the user experience, they increase the network load at all times and do not use a prediction of future content item probabilities to determine which content to cache.

A caching mechanism for broadcast content is maintained within various current embodiments of the Internet Protocol Television (IPTV) system. Within such systems, a frame which fully refreshes the video image may be sent at intervals that are more than 10 seconds apart. Intervening data gives only incremental changes from the full refresh frame. In these embodiments, 'D Servers' cache a small number of video frames and send these frames to client set-top boxes via a unicast transmission in order to provide fast channel changing. At the first full screen refresh frame, the client will join the multicast channel and the unicast stream from the D servers will stop. In these embodiments, however, the network is arranged in a strict hierarchy such that each D Server has a defined single parent server. Thus, when content is unavailable on the parent server, the D Server cannot retrieve content from other peer network nodes. Moreover, caching data at the D Servers damages network efficiency, as the unicast stream from the D Servers when the channel is changed occupies more bandwidth than the multicast channel that is eventually joined by the client. Furthermore the D Server will also generally reduce network efficiency on the side facing the content source, since it requires a feed of every video channel to keep the cached content fresh, even if many or all of those video channels are not watched by any users in the area that the D Server serves.

In various current embodiments, a personal video recorder creates a wish list of content to record and records that content as it appears in the broadcast schedule. These embodiments, however, do not actively request content items in anticipation of future viewing. Moreover, content is only stored on the user's personal video recorder and not at local or distant locations. Thus, because content is never shared, there is a significant cost disadvantage in terms of storage space.

In various current embodiments, a peer-to-peer file sharing network allows a user to define a list of desired content, which it will then obtain from one or more other users. In these embodiments, however, the user must explicitly request content. Moreover, transfers do not consider network loading or costs and are therefore significantly disruptive to the network service provider. Thus, peer-to-peer networks have storage only at the user end and ignore all network capacity and cost issues.

Various current embodiments attempt to mitigate the negative effects of peer-to-peer file sharing as a content distribution mechanism. Various current embodiments intercept the peer-to-peer protocol through a man-in-the-middle attack. These embodiments find a requested file fragment within a user's local network and redirect the request to source the file from within the local network. Consequently, the content distribution network prevents the peer-to-peer network from using expensive links across wide area networks or peering points to source data that could have been obtained locally. These embodiments, however, do not actually store any data in the network and only provide an index to data that recognizes proximity. Moreover, these embodiments increase local network costs by forcing uploads to come from a local customer, which is particularly troublesome in networks with limited upload bandwidth.

Various current embodiments create a local flow-through network caching point at which P2P files are stored for delivery to multiple users. These embodiments store the file in a local server, typically a central office, and thus avoid both upstream link congestion from other local customers and loading on the WAN link. These embodiments, however, only cache content after the fact, thereby fundamentally limiting the achievable efficiency. Moreover, like other caching systems, these embodiments do not consider network loading.

In summary, the above-described current embodiments are not particularly effective and often result in an increase in network congestion. Moreover, none of the previously described caching mechanisms utilize predictions regarding content likely to be requested by users to maximize efficiency of caching.

According to the forgoing, various exemplary embodiments provide a mechanism for using a prediction of content items that will be consumed to create an economically optimal predictive content distribution network and to maintain this optimal state in the presence of changing network conditions. Thus, given a network consisting of network links with a defined capacity and caching nodes capable of storing content items, various exemplary embodiments maximize the serving capacity of the network that can be provided at peak periods.

Various exemplary embodiments use predictions of content item consumption to dynamically retrieve content during off-peak periods or to capture that content from a broadcast network. In various exemplary embodiments, each caching node decides whether to download, record, or drop content items utilizing these predictions and downloads selected content items during an off-peak time.

Recording from a broadcast network never influences peak load and therefore may take place whenever the desired content item is transmitted. Recording from a selective one-to-many distribution network mode, such as multicast and switched broadcast, may take place without influencing peak load in the following circumstances: when at least one customer in the portion of the network is watching the channel on which the content item occurs; when the time that the transmission occurs is off-peak; or when there is a hard partitioning of the bandwidth such that switched broadcast or multicast bandwidth is always reserved to meet a worst-case peak. Thus, in various exemplary embodiments, the caching mechanism recognizes and adjusts for all elements of network loading that influence cost and service capacity, including link capacity, switching or routing capacity, and content serving capacity.

In various exemplary embodiments, content is stored at various locations within the content distribution network. Thus, in various exemplary embodiments, content is pulled from parent caching nodes, peer caching nodes, or recorded from broadcast or multicast networks. In addition, in various exemplary embodiments, content may be stored at user locations or at multiple layers within the service provider's network.

In various exemplary embodiments, the content distribution network runs one or more processes to optimize storage of content. Thus, in various exemplary embodiments, the caching mechanism avoids unnecessary duplication of content by running an updating protocol between caching nodes. Moreover, in various exemplary embodiments, the caching mechanism runs a housekeeping function that drops stored content items if the caching capacity is nearly full and if more valuable content items are available for storage.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
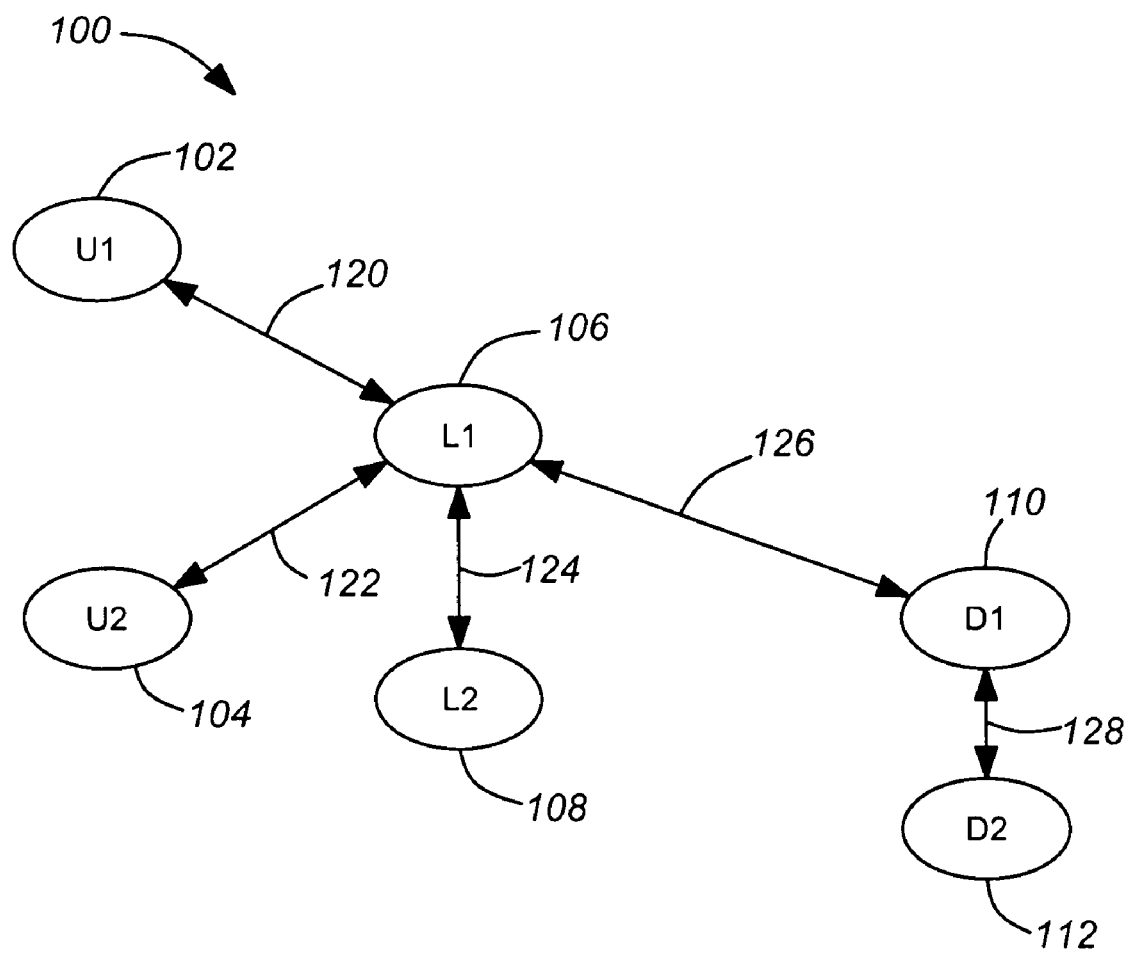
FIG. 1 is a schematic diagram of an exemplary embodiment of a content distribution network utilizing predictive caching of content.

Referring now to the drawings, in which like numerals refer to like components or steps, there are disclosed broad aspects of various exemplary embodiments.

As used herein, the following terms are defined as described below. The subject matter referred to by reference characters in these definitions will be described in greater detail below.

LinkCapacity($L_1 \rightarrow U_1$) means the capacity of communication link 120 when sending data from first local network store 106 to first user store 102.

LinkCapacity($U_1 \rightarrow L_1$) means the capacity of communication link 120 when sending data from first user store 102 to first local network store 106.

LinkCapacity($L_1 \rightarrow U_2$) means the capacity of communication link 122 when sending data from first local network store 106 to second user store 104.

LinkCapacity($U_2 \rightarrow L_1$) means the capacity of communication link 122 when sending data from second user store 104 to first local network store 106.

LinkCapacity($L_1 \rightarrow L_2$) means the capacity of communication link 124 when sending data from first local network store 106 to second local network store 108.

LinkCapacity($L_2 \rightarrow L_1$) means the capacity of communication link 124 when sending data from second local network store 108 to first local network store 106.

LinkCapacity($L_1 \rightarrow D_1$) means the capacity of communication link 126 when sending data from first local network store 106 to first distant network store 110.

LinkCapacity($D_1 \rightarrow L_1$) means the capacity of communication link 126 when sending data from first distant network store 110 to first local network store 106.

ServingCapacity($D_1$) means the content serving capacity at first distant network store 110.

ServingCapacity($L_1$) means the content serving capacity at first local network store 106.

Storage($D_1$) means the quantity of storage at first distant network store 110.

Storage($L_1$) means the quantity of storage at first local network store 106.

Storage($U_1$) means the quantity of storage at first user store 102.

Storage($U_2$) means the quantity of storage at second user store 104.

SwitchCapacity($D_1$) means the switching or routing capacity at first distant network store 110.

SwitchCapacity($L_1$) means the switching or routing capacity at first local network store 106.

FIG. 1 is a schematic diagram of an exemplary embodiment of a content distribution network 100 utilizing predictive caching of content. With reference to FIG. 1, the general operation of exemplary content distribution network 100 and the predictive caching process will be described.

Exemplary content distribution network 100 includes first user store 102, second user store 104, first local network store 106, second local network store 108, first distant network store 110, and second distant network store 112. It should be apparent that, in various exemplary embodiments, each store comprises permanent storage that enables the store to maintain a cache of multimedia content. In addition, in various exemplary embodiments, each store comprises an index to determine if a content item is held locally on that node and an index to determine where to look for content items that are not held locally.

In various exemplary embodiments, each store is capable of communicating with one or more other stores via a communication link. Thus, in exemplary content distribution network 100, first user store 102 communicates with first local network store 106 via communication link 120, second user store 104 communicates with first local network store 106 via communication link 122, first local network store 106 communicates with second local network store 108 via communication link 124 and with first distant network store 110 via communication link 126, and first distant network store 110 communicates with second distant network store 112 via communication link 128.

Accordingly, exemplary content distribution network 100 includes four tiers in the caching architecture. The first level of caching corresponds to first user store 102, which, in various exemplary embodiments, is a home-based media storage unit that stores content specific to a single user or household. It should be apparent that, in various exemplary embodiments, the first user store 102 is a personal computer, a personal video recorder, a home media server, a set-top television box with built-in storage, portable media device, or any other storage device with network communication capabilities.

In exemplary content distribution network 100, the second level of caching corresponds to peers in the network, such as second user store 104. The third level of caching is at a central node within a local network to which many users are attached, such as first local network store 106 and second local network store 108. Finally, the fourth level of caching is at a regional or national node to which many local network stores are attached, such as first distant network store 110 and second distant network store 112. Although exemplary content distribution network 100 includes four tiers of caching, it should be apparent that, in various exemplary embodiments, content distribution network 100 is extended to include additional central caching servers at more distant locations. Moreover, in various exemplary embodiments, content distribution network 100 includes more than two nodes at one or more of the tiers.

Figure 2:
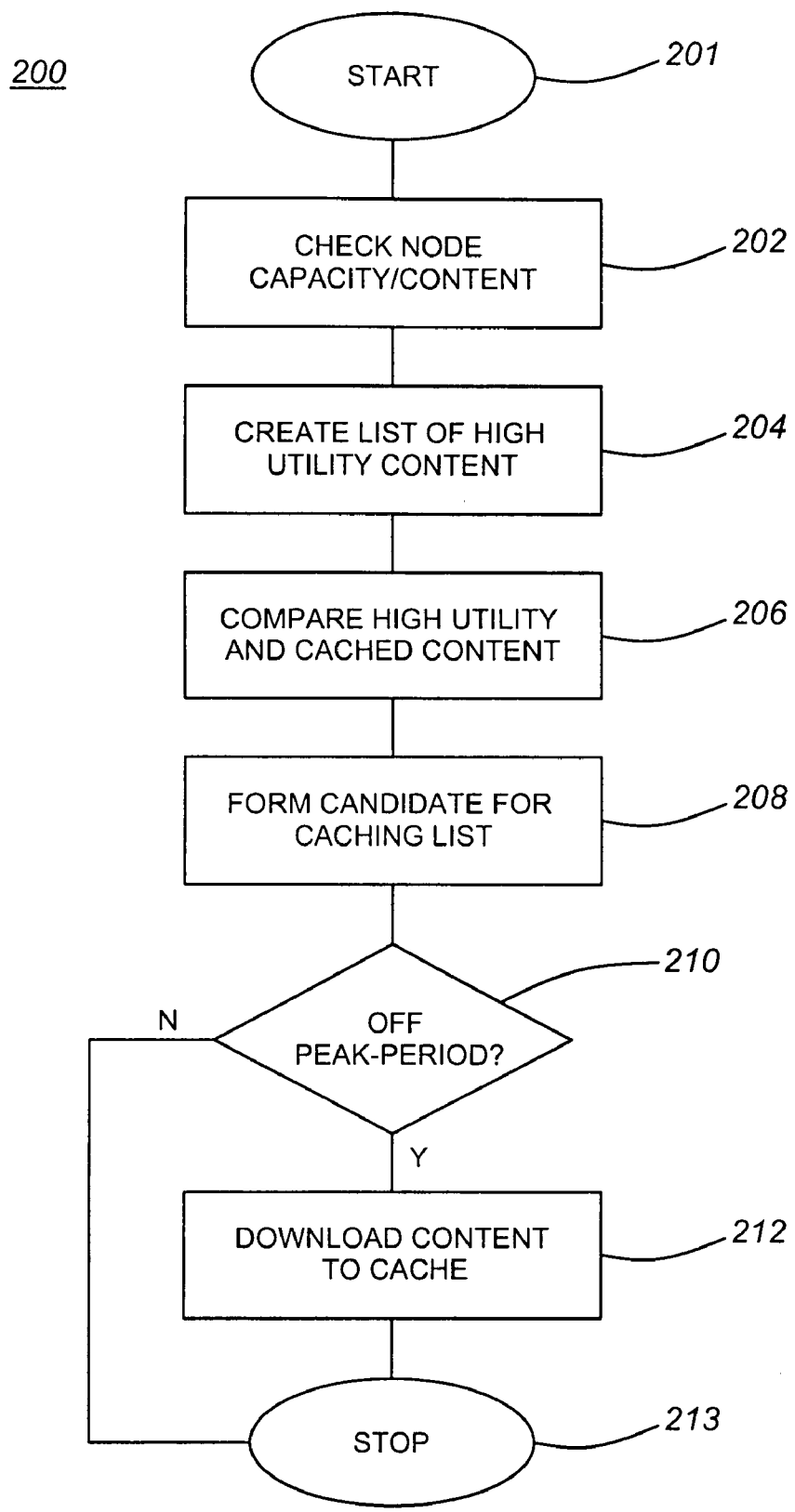
FIG. 2 is a flow chart of an exemplary embodiment of a method of adding or dropping a content item to or from a cache from a unicast source.

FIG. 2 is a flow chart of an exemplary embodiment of a method 200 of adding or dropping a content item to or from a cache from a unicast source. In various exemplary embodiments, exemplary method 200 determines whether to cache a new item from an upstream source. It should be apparent that exemplary method 200 may be executed at any node in a content distribution network that has the capability of caching content. Thus, in various exemplary embodiments, exemplary method 200 is executed at one or more of first user store 102, second user store 104, first local network store 106, second local network store 108, first distant network store 110, and second distant network store 112.

Exemplary method 200 starts in step 201 at periodic intervals or when a change occurs that influences the probability of future content access. Thus, in various exemplary embodiments, exemplary method 200 executes hourly, daily, or at some other predetermined time interval. Moreover, in various exemplary embodiments, exemplary method 200 executes when a new multimedia content item is released or a user indicates an interest in, for example, a particular genre of movies or music, thereby changing the prediction of the value of caching those types of content items.

Exemplary method 200 then proceeds to step 202, where a check is performed to determine the amount of unused capacity, amount of used capacity, and a measure of utility of all items currently cached in the node. The measure of utility is generally based on the number of users who may use that content item combined with the likelihood that each user will use that content item. In various exemplary embodiments, the measure of utility also includes other factors such as the value of having a content item available from the distributed store in terms of its beneficial effect in offloading peak demand from the network or in improving the quality with which the content item can be delivered to the user. Following step 202, exemplary method 200 proceeds to step 204, where the node creates a list of highest utility content items.

When the cache is a user node, such as first user store 102, in various exemplary embodiments, the list of highest utility content items relates only to the user or household. In various exemplary embodiments, when the cache is a network node, such as first local network store 106, the list of highest utility content items is a measure indicative of the cumulative probability of use or, more generally, utility formed by the lists from each of the supported user nodes. Content items already stored at those user nodes will generally have no utility associated with saving a new copy of that same content item.

Thus, in various exemplary embodiments, the list of highest utility content items reflects the probability that an item will be requested from the caching node or the utility of caching a new instance of such an item, and will thus exclude the items that have already been cached closer to the user. It should be apparent that, in various exemplary embodiments, step 204 creates a self-organizing hierarchy of rarity. In other words, content items with high probability of access tend to be cached closer to the user, while rarely accessed items are stored more centrally, for example, at first distant network store 110. In various exemplary embodiments, when there is a high probability of access for only a few users, the content items are by preference cached at level 1, e.g., first user store 102. If, on the other hand, there is a high probability of access by many users, the content items will by preference be cached at level 3, e.g., first local network store 106.

In various exemplary embodiments, the list of highest utility content items is further refined to reflect the probability that the item will be accessed during a peak period. Thus, in various exemplary embodiments, the list of highest utility content items further increases the offloading effect.

After creation of the list of highest utility content items, exemplary method 200 proceeds to step 206, where the node compares the list of highest utility content items to the list of content currently cached at the node. In various exemplary embodiments, the list of content currently cached at the node includes items which are scheduled to be recorded from a broadcast, switched broadcast, or multicast network at a point in the future, as further described below with reference to FIG. 4.

After the comparison, exemplary method 200 proceeds to step 208, where the node generates a ranked list of candidate content items for caching, which, in various exemplary embodiments, comprises the list of highest utility content items less the list of content currently cached at the node. Thus, in various exemplary embodiments, the ranked list of candidate content items for caching comprises all items in the list of highest utility contents items that are not currently cached at the node. In various exemplary embodiments, the candidate for caching list includes an identifier for the content item and a measure of utility indicative of the probability of use for each content item.

In various exemplary embodiments, in step 208, the size of each item may also be considered in ranking of the candidate for caching list. Thus, in various exemplary embodiments, where the node must make a choice between a large content item and a group of smaller content items of nearly equal probability of access, the group of small content items receives a higher rank, thereby increasing the probability that one of the items will be accessed.

After generating the candidate for caching list, exemplary method 200 then proceeds to step 210, where the node determines whether the current time is in an off-peak period. When, in step 210, the node determines that the current time is not an off-peak period, the node will not download any content. Thus, exemplary method 200 proceeds to step 213, where exemplary method 200 stops. It should be apparent that, in various exemplary embodiments, exemplary method 200 proceeds to step 212 even if the next period is a peak period, but only to allow downloads to be scheduled for off-peak times in the feature.

When, in step 210, the node determines that the next period of time is an off-peak period, exemplary method 200 proceeds to step 212, where the node downloads content to the cache. In various exemplary embodiments, when a download will a minimum length of time to complete or when it is scheduled for a point in the future, an entry in the content inventory for that node records the content item as 'pending', thereby preventing parallel attempts to retrieve the same content item. Exemplary method then proceeds to step 213, where exemplary method 200 stops.

Figure 3:
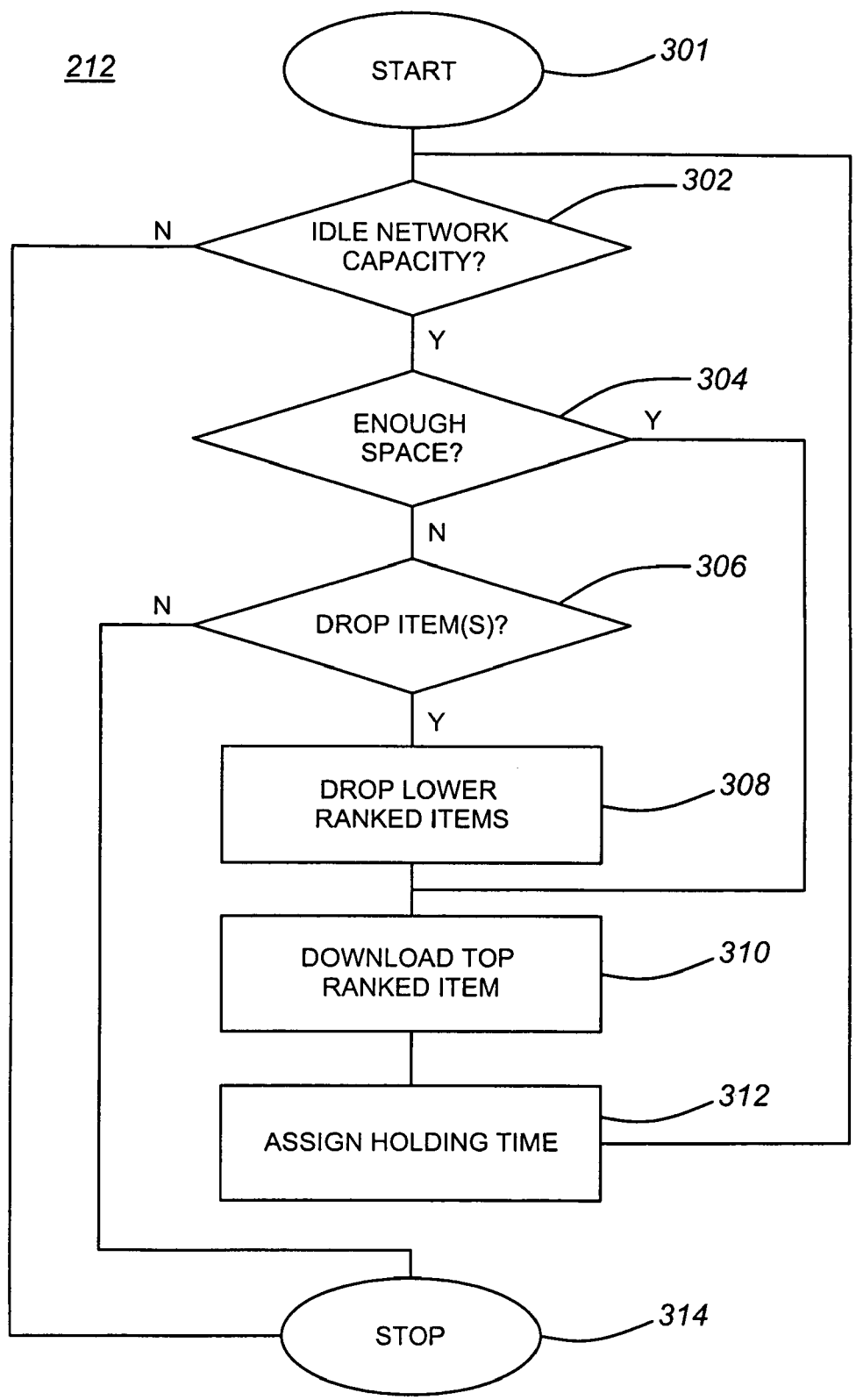
FIG. 3 is a flow chart of an exemplary embodiment of a method for downloading content to a cache from a unicast source.

FIG. 3 is a flow chart of an exemplary embodiment of a method 212 for downloading content to a cache from a unicast source. Exemplary method 212 starts in step 301 and proceeds to step 302, where the node determines whether all upstream components including links, switches, and servers are signaling idle capacity. When, in step 302, the node determines that one or more links, switches, or servers is signaling that there is no idle capacity, exemplary method 212 proceeds to step 314, where exemplary method 212 stops. When, in step 302, the node determines that all links, switches, and servers have signaled idle capacity, exemplary method 212 proceeds to step 304.

In various exemplary embodiments, in step 304, the node determines whether the cache has sufficient free storage capacity to store the top ranked content item from the list of candidate content items for caching. When, in step 304, the node determines that there is sufficient free storage, exemplary method 212 proceeds to step 310, where the node downloads the top ranked item from the upstream node to the cache.

In various exemplary embodiments, once an item is downloaded in step 310, exemplary method 212 proceeds to step 312, where the content item is assigned a holding time during which the item will not be replaced. In such embodiments, when the holding time has not expired, the content item will not be dropped from the cache unless the probability of the new item minus the probability of the saved item is greater than a predetermined swap threshold. Thus, in such embodiments, exemplary method 212 prevents a process called "churning," in which a content item is repeatedly downloaded and dropped in favor of another content item with very similar ranking. Exemplary method 212 then returns to step 302 for further execution.

When, in step 304, the node determines that there is insufficient free storage, exemplary method 212 proceeds to step 306. In various exemplary embodiments, in step 306, the node determines whether the top ranked candidate content item is of higher utility by at least the swap threshold than the lowest item previously cached that is also equal to or greater in size than the candidate item. If such a lower utility previously cached item is found, then exemplary method 212 proceeds to step 308, where the previous lower utility item is dropped.

If no lower utility previously cached item is found, then the top ranked candidate content item is compared to a set of previously cached items which collectively is larger in size than the candidate content item. If the utility of the top ranked candidate content item is higher by at least the swap threshold than the aggregate utility of the selected set of previously cached items, then exemplary method 212 proceeds to step 308, where the node drops the set of previously cached lower utility items.

After dropping the lower utility items from the cache, exemplary method 212 then proceeds to step 310, where the node downloads the top ranked item. After executing the downloading and dropping procedure, exemplary method 212 optionally assigns an item minimum holding time to reduce the chances of item churn and optionally assigns a maximum holding time to allow periodic flushing of stale content items from the cache. Exemplary method 212 then proceeds to step 302, where the next potential content item is considered if the network is in an off-peak period.

When, in step 306, the node does not find a combination of lower utility items with a combined size greater than the size of the top ranked content item, exemplary method proceeds to step 314, where exemplary method 212 stops.

Figure 4:
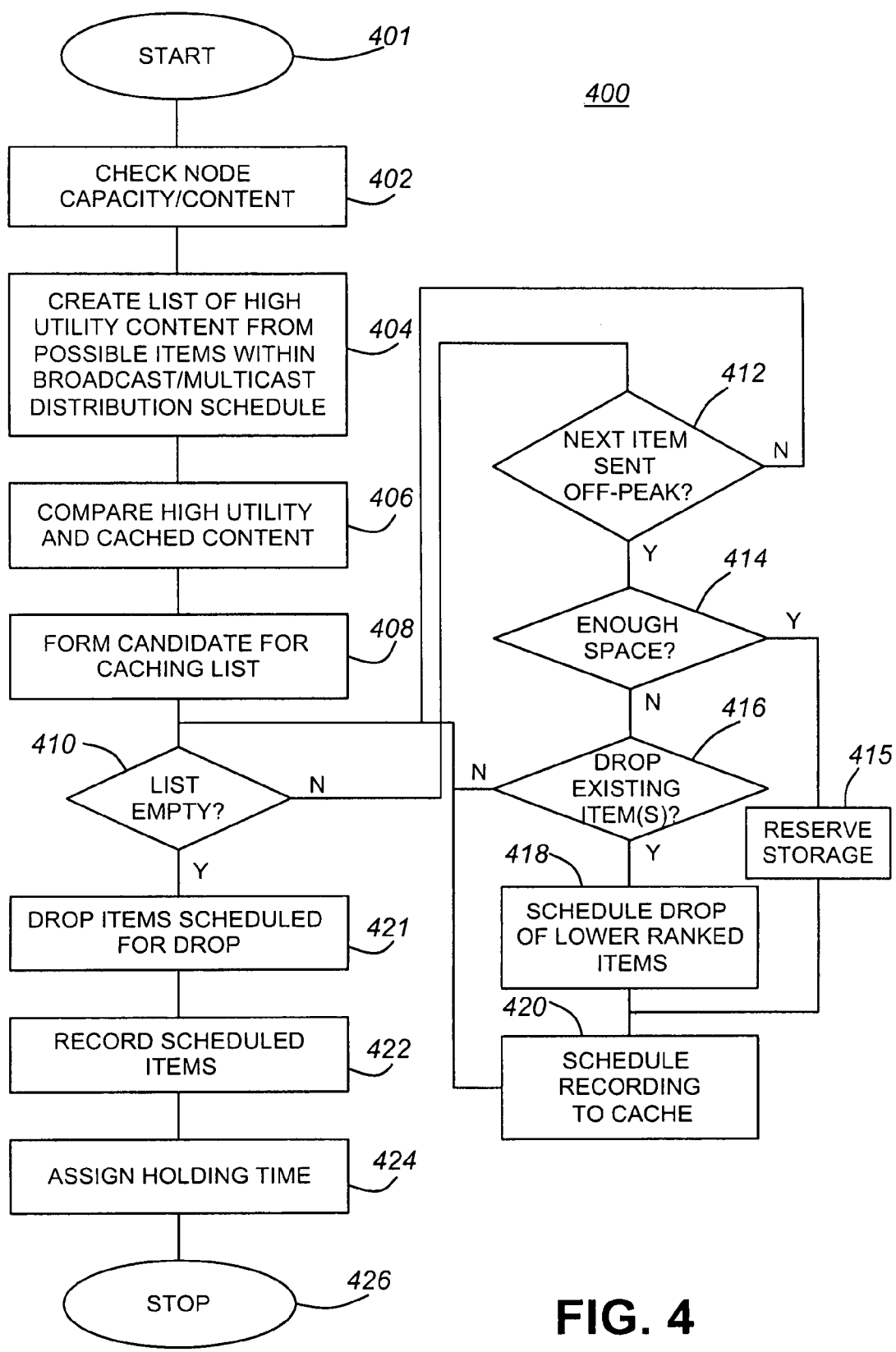
FIG. 4 is a flow chart of an exemplary embodiment of a method of adding or dropping a content item to or from a cache from a broadcast, switched broadcast, or multicast source.

FIG. 4 is a flow chart of an exemplary embodiment of a method 400 of adding or dropping a content item to or from a cache from a broadcast or multicast source. In various exemplary embodiments, exemplary method 400 determines whether to cache a new item by recording it from a broadcast, switched broadcast, or multicast source. It should be apparent that exemplary method 400 may be executed at any node in a content distribution network that has the capability of caching content. Thus, in various exemplary embodiments, exemplary method 400 is executed at one or more of first user store 102, second user store 104, first local network store 106, second local network store 108, first distant network store 110, and second distant network store 112.

Exemplary method 400 starts in step 401 at periodic intervals or when a change occurs that influences the probability of future content access. Thus, in various exemplary embodiments, exemplary method 400 executes hourly, daily, or at some other predetermined time interval. Moreover, in various exemplary embodiments, exemplary method 400 executes when a new multimedia content item is released, when a broadcast/switched broadcast/multicast distribution schedule changes or is extended to cover a new period in the future, when users indicate an interest in, for example, a particular genre of movies or music, or when any other behavior triggers a reevaluation of the probability that users will access given content items.

Exemplary method 400 then proceeds to step 402, where a check is performed to determine the amount of unused capacity, amount of used capacity, and utility for all items currently cached in the node. Following step 402, exemplary method 400 proceeds to step 404, where the node creates a list of highest utility content items from those content items which appear in the broadcast/multicast distribution schedule. In various exemplary embodiments, in step 404, the node obtains the broadcast or multicast content distribution schedule from, for example, an electronic program guide.

In various exemplary embodiments, in step 404, the node creates the list of highest utility content items by comparing specified user interests for all users drawing content from the node to the content items in the schedule of available broadcast or multicast content. In various exemplary embodiments, the user interests include one or more of favorite genres, movies, television shows, channels, actors, directors, and any other criteria that can be used to classify or categorize a content item. Moreover, in various exemplary embodiments, the interests are specified by the user or are predicted based on the user's prior content selections.

When the cache is a user node, such as first user store 102, in various exemplary embodiments, the list of highest utility content items relates only to the user or household. In various exemplary embodiments, when the cache is a network node, such as first local network store 106, the list of highest utility content items is the cumulative utility formed by the lists from each of the supported user nodes.

After creation of the list of highest utility content items in step 404, exemplary method 400 proceeds to step 406, where the node compares the list of highest utility content items to the list of content currently cached at the node. After the comparison, exemplary method 400 proceeds to step 408, where the node generates a ranked candidate for caching list, which, in various exemplary embodiments, comprises the list of highest utility content items less the list of content currently cached at the node. Thus, in various exemplary embodiments, the ranked candidate for caching list comprises all items in the list of highest utility contents items that are not currently cached at the node. In various exemplary embodiments, the candidate for caching list includes the size of the item, the utility of that item based on number of users and likelihood of use of the item, and a time, date, and channel on which the item can be accessed.

Exemplary method 400 then proceeds to step 410, where the node determines whether the list of candidate items to cache is empty. When, in step 410, the node determines that the list of candidate items to cache is empty, exemplary method 400 proceeds to step 421, where the node drops any items scheduled to be dropped to make room for new items. Exemplary method 400 then proceeds to step 422, where any items scheduled for recording are recorded. After recording the scheduled items, exemplary method 400 proceeds to step 424, where the items that have been recorded are assigned a holding time. In step 424, exemplary method 400 optionally assigns an item a minimum holding time to reduce the chances of item churn and optionally assigns a maximum holding time to allow periodic flushing of stale content items from the cache. Exemplary method 400 then proceeds to step 426, where exemplary method 400 stops.

When, in step 410, the node determines that there candidate content items to consider, exemplary method 400 proceeds to step 412, where the node determines whether the point in time where a candidate content item can be accessed is in an off-peak period. It should be apparent that this step applies to networks in which distribution is discretionary, such as multicast networks or switched broadband networks. Networks which use the same capacity (e.g. number of channels) at all times, as is generally true for broadcast networks, can be considered to be off-peak at all times, since recording an item to a cache has no effect on network loading. In addition, a switched broadcast or multicast network experiences no additional load when there are other viewers at that point in time, so, if other viewers are likely, the content item is considered to be off-peak regardless of when it is accessed. A switched broadcast or multicast network can also be considered to be off-peak if the network provider has hard-partitioned the bandwidth such that bandwidth is reserved for worst case channel loading at all times. In this event, recording content items has no influence on the bandwidth required.

When, in step 412, the node determines that the time at which the content item can be accessed is a peak period, the node will not schedule recording of the content item and exemplary method 400 proceeds back to step 410, where the next candidate content item is considered. It should be apparent that a single content item may be distributed on more than one channel at different points in time, so a single content item may have to be considered multiple times at step 410, once for each possible period in time.

When, in step 412, the node determines that the time at which the content item can be accessed is an off-peak period, exemplary method 400 proceeds to step 414, where the node determines whether the cache has sufficient free storage capacity to store the top ranked content item from the list of candidate content items for caching. When, in step 414, the node determines that there is sufficient free storage, exemplary method 400 proceeds to step 415, where storage capacity is reserved. Exemplary method 400 then proceeds to step 420, where the node schedules the top ranked item to be recorded to the cache at the date, time, and channel that the content item is transmitted. Exemplary method 400 then returns to step 410, where exemplary method 400 considers other content items.

When, in step 414, the node determines that there is insufficient free storage, exemplary method 400 proceeds to step 416. In various exemplary embodiments, in step 416, the node determines whether the top ranked candidate new content item is of higher utility by at least a swap threshold than the lowest item previously cached that is also equal to or greater in size than the candidate item. When such a lower utility previously cached item is found, then exemplary method 400 proceeds to step 418 where the previous lower utility item is scheduled to be dropped. Exemplary method 400 then proceeds to step 420, where the candidate content item is scheduled for recording, and to step 410, where the next candidate content item is considered.

When a single lower utility content item is not currently stored, the top ranked candidate new content item is compared to a set of previously cached items which collectively are larger in size than the candidate new content item. If the utility of the top ranked candidate new content item is higher by at least a swap threshold than the aggregate utility of the set of previously cached items, exemplary method 400 proceeds to step 418. In step 418, the set of previously cached lower utility items is scheduled to be dropped. Exemplary method 400 then proceeds to step 420, where the candidate content item is scheduled for recording, and to step 410, where the next candidate content item is considered.

When in step 416, it is determined not to drop an existing item or items, exemplary method 400 returns to step 410, where the next candidate content item is considered.

It should be apparent that, although illustrated separately for clarity, in various exemplary embodiments, the exemplary methods 200, 400 described with reference to FIGS. 2 and 4 cache information in the same stores on behalf of the same end-users. Moreover, in various exemplary embodiments, the methods described with reference to FIGS. 2-4 are coordinated in steps 206 and 406, such that any given content item is only retrieved and stored once. Additionally, in various exemplary embodiments, exemplary methods 200, 400 utilize the same methodology for calculation of content item utility, such that there is always agreement about which content items are the most valuable and therefore should be held if storage space is constrained.

Figure 5A:
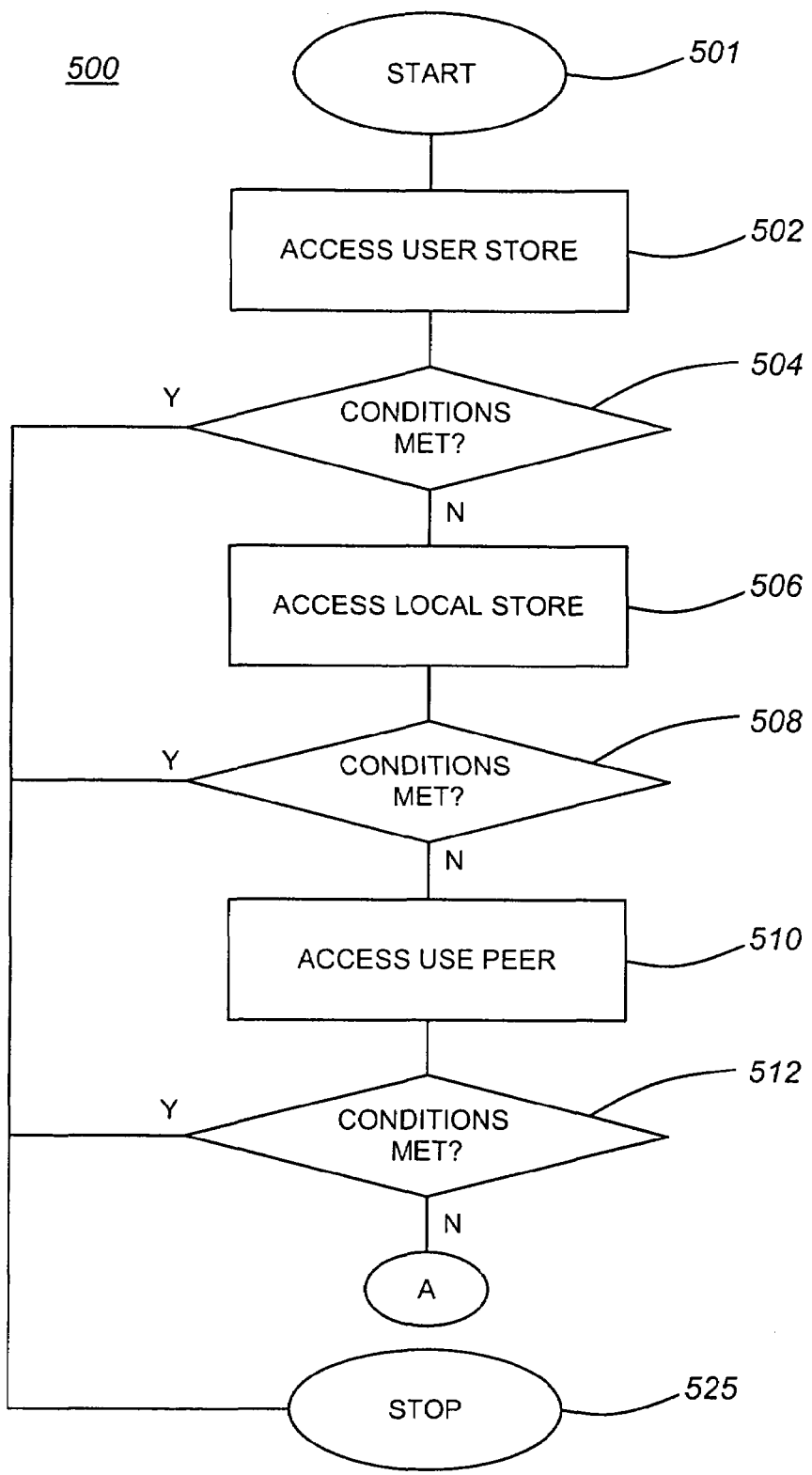
FIGS. 5A and 5B are flow charts of an exemplary embodiment of a method of accessing a content item from a network of interconnected caches.
Figure 5B:
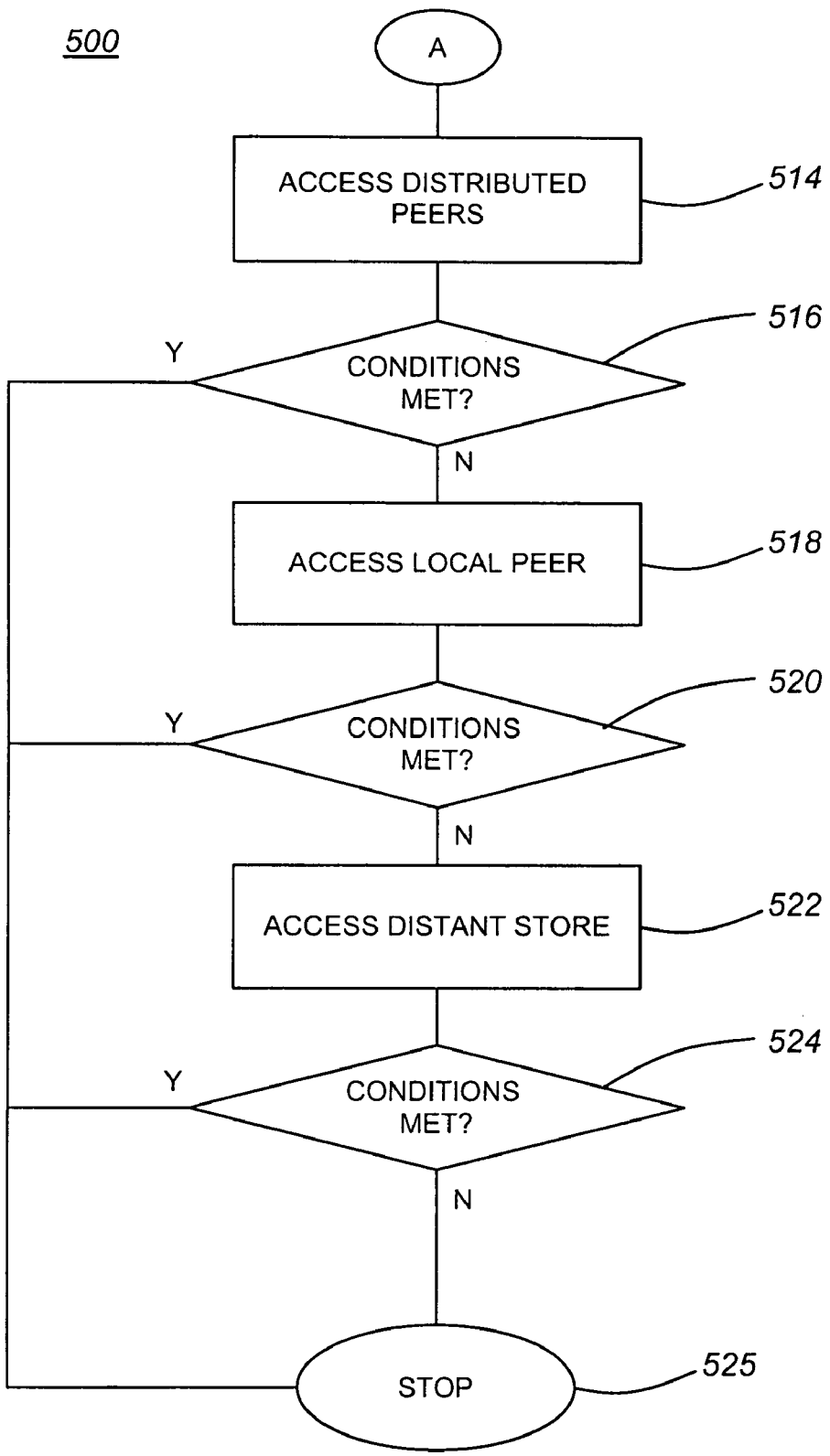

FIGS. 5A and 5B are flow charts of an exemplary embodiment of a method 500 of accessing a content item from a network of interconnected caches. Exemplary method 500 starts in step 501 of FIG. 5A and proceeds to step 502, where the node accesses first user store 102. Exemplary method then proceeds to step 504, where exemplary method 500 determines whether the requested content is available in first user store 102. When, in step 504, the node determines that the content is available at first user store 102, the method proceeds to step 525, where exemplary method 500 stops.

When, in step 504, the node determines that the requested content is not available at the user node, the method proceeds to step 506, where the node accesses first local network store 106. Exemplary method 500 then proceeds to step 508, where, in various exemplary embodiments, exemplary method 500 determines whether the requested content item is cached at first local network store 106, whether LinkCapacity ($L_1 \rightarrow U_1$) is greater than the capacity used by all sessions across communication link 120, and whether ServingCapacity($L_1$) is greater than the sum of all user sessions delivered from first local network store 106. When, in step 508, all conditions are satisfied, exemplary method 500 downloads the content from first local network store 106 and proceeds to step 525, where exemplary method 500 stops.

When, in step 508, one or more conditions is not satisfied, exemplary method 500 proceeds to step 510, where the node accesses second user store 104. Exemplary method 500 then proceeds to step 512, where, in various exemplary embodiments, exemplary method 500 determines whether the requested content item is cached at second user store 104, whether LinkCapacity($L_1 \rightarrow U_1$) is greater than the capacity used by all sessions across communication link 120, whether LinkCapacity($U_2 \rightarrow L_1$) is greater than the capacity used by all sessions across communication link 122, and whether SwitchCapacity($L_1$) is greater than the sum of all switched traffic at first local network store 106. When, in step 512, all conditions are satisfied, exemplary method 500 downloads the content from second user store 104 through first local network store 106 and proceeds to step 525, where exemplary method 500 stops.

When, in step 512, one or more conditions is not satisfied, exemplary method 500 proceeds to step 514 of FIG. 5B, where the node accesses multiple user nodes. Exemplary method 500 then proceeds to step 516, where, in various exemplary embodiments, exemplary method 500 determines whether the requested content item is cached in multiple fragments at two or more of the user nodes. In various exemplary embodiments, at step 516, the node also determines whether LinkCapacity($L_1 \rightarrow U_1$) is greater than the capacity used by all sessions across communication link 120, whether LinkCapacity($U_i \rightarrow L_1$) is greater than the capacity used by all sessions across each communication link, where $U_i$ is the ith user node, and whether SwitchCapacity($L_1$) is greater than the sum of all switched traffic at first local network store 106. When, in step 516, all conditions are satisfied, exemplary method 500 downloads the content from the distributed user nodes and proceeds to step 525, where exemplary method 500 stops.

When, in step 516, one or more conditions is not satisfied, exemplary method 500 proceeds to step 518, where the node accesses second local network store 108. Exemplary method 500 then proceeds to step 520, where, in various exemplary embodiments, exemplary method 500 determines whether the requested content item is cached at second local network store 108, whether LinkCapacity($L_1 \rightarrow U_1$) is greater than the capacity used by all sessions across communication link 120, whether LinkCapacity($L_2 \rightarrow L_1$) is greater than the capacity used by all sessions across communication link 124, and whether SwitchCapacity($L_1$) is greater than the sum of all switched traffic at first local network store 106. When, in step 520, all conditions are satisfied, exemplary method 500 downloads the content from second local network store 108 through first local network store 106 and proceeds to step 525, where exemplary method 500 stops.

When, in step 520, one or more conditions is not satisfied, exemplary method 500 proceeds to step 522, where the node accesses first distant network store 110. Exemplary method 500 then proceeds to step 524, where, in various exemplary embodiments, exemplary method 500 determines whether the requested content item is cached at first distant network store 110, whether LinkCapacity($L_1 \rightarrow U_1$) is greater than the capacity used by all sessions across communication link 120, whether LinkCapacity($D_1 \rightarrow L_1$) is greater than the capacity used by all sessions across communication link 126, whether SwitchCapacity($L_1$) is greater than the sum of all switched traffic at first local network store 106, and whether ServingCapacity($D_1$) is greater than the sum of all user sessions delivered from first distant network store 110. When, in step 520, all conditions are satisfied, exemplary method 500 downloads the content from first distant network store 110 through first local network store 106 and proceeds to step 525, where exemplary method 500 stops.

When, in step 524, one or more conditions is not satisfied, exemplary method 500 notifies the user that the download was unsuccessful due to unavailability of the requested content item or due to insufficient network capacity. Exemplary method 500 then proceeds to step 525, where exemplary method 500 stops.

Figure 6:
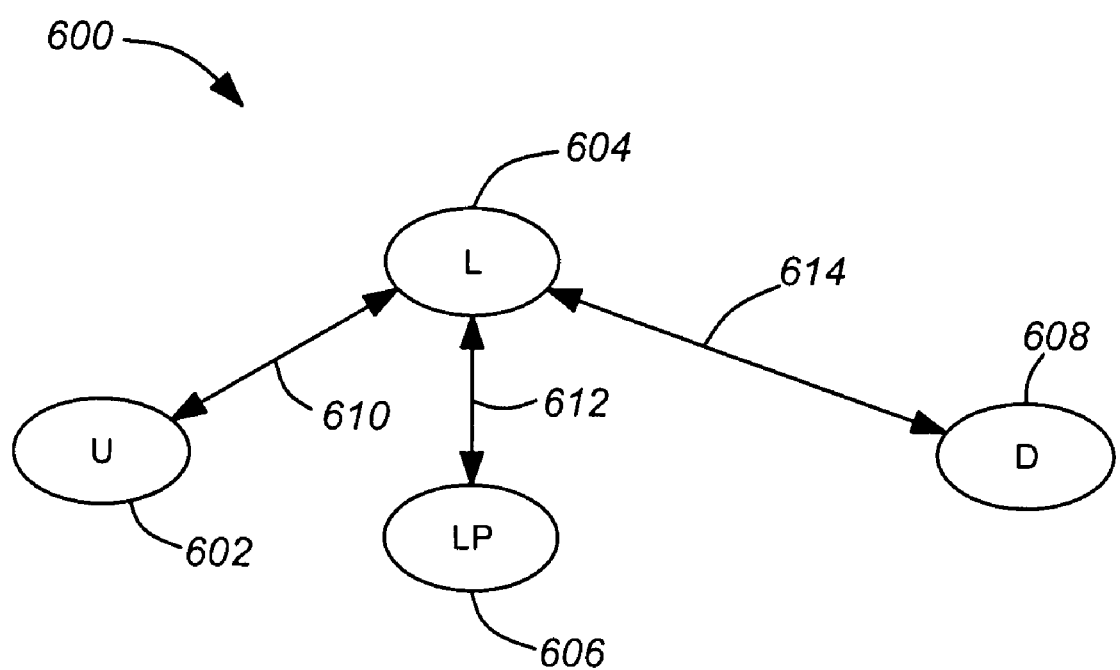
FIG. 6 is a schematic diagram of an exemplary embodiment of a content distribution network with communication of updates between nodes.

FIG. 6 is a schematic diagram of an exemplary embodiment of a content distribution network 600 with communication of updates between nodes.

Exemplary content distribution network 600 includes user store 602, local store 604, local peer store 606, and distant store 608. In various exemplary embodiments, each store is capable of communicating with one or more other stores via a communication link: Thus, in exemplary content distribution network 600, user store 602 communicates with local store 604 via communication link 610, local store 604 communicates with local peer 606 via communication link 612, and local store 604 communicates with distant store 608 via communication link 614.

In various exemplary embodiments, each node of content distribution network 600 provides one or more forms of update messages to inform neighboring nodes about the content stored on the node. Thus, in various exemplary embodiments, each node of content distribution network 600 provides a full update, which is a listing of all content items stored on the node, with each content item identified by an indexing identifier. In various exemplary any node may send a request to one or more neighboring nodes for a full update at any time. Moreover, in various exemplary embodiments, the full update procedure occurs when a new node is installed into content distribution network 600.

In various exemplary embodiments, each node of content distribution network 600 provides an incremental update, which notifies neighboring nodes of content added or dropped since the last message. In order to communicate incremental updates, in various exemplary embodiments, the node sends the message in the format "Added a, b, c Dropped e, f, g," where a-g are content item identifiers. In addition, in various exemplary embodiments, these messages are communicated by embedding an ASCII text string in an XML or SOAP file.

In various exemplary embodiments, notification of updates occurs between user store 602 and local store 604 in both directions over communication link 610. Moreover, in various exemplary embodiments, notification of updates occurs between local store 604 and distant store 608 in both directions over communication link 614. In various exemplary embodiments, notification of updates occurs over communication link 612 only in the direction from local store 604 to local peer store 606.

In various exemplary embodiments, each node supports an additional message type that communicates an intention to cache. Thus, in various exemplary embodiments, a node sends a message to other nodes indicating an intention to record an upcoming broadcast or multicast program. Accordingly, a node can check candidate-to-cache lists from neighboring nodes to determine popular items and cache the item to facilitate future requests.

In various exemplary embodiments, each node of content distribution network 600 provides one or more forms of update messages to inform neighboring nodes about network utilization over one or more of communication link 610, communication link 612, and communication link 614. In various exemplary embodiments, utilization is a separate or composite measure that incorporates all factors reflecting the ability to deliver content, including link utilization, switching or routing utilization, and content server utilization. Thus, in various exemplary embodiments, the utilization information includes the portion of available capacity that is in use at the node compared to the total capacity available. Moreover, in various exemplary embodiments, the utilization information is instead a true or false value, indicating whether capacity is available over the communication link.

In various exemplary embodiments, a node may send a request to one or more neighboring nodes for an update on network status. In contrast, in various exemplary embodiments, a node sends an update to a neighboring node automatically. In various exemplary embodiments, the update message is a periodic update, which sends the utilization conditions at periodic intervals. In addition, in various exemplary embodiments, the update message is an alarm update, which notifies the neighboring nodes that the network utilization has reached a critical threshold and that all discretionary traffic should be avoided. Moreover, in various exemplary embodiments, these messages are communicated by embedding an ASCII text string in an XML or SOAP file. Thus, in various exemplary embodiments, the message is in a format similar to "L1 OK" or "L1→U1 65%, L1 Switching 43%, L1 Server 39%."

In view of the forgoing, an example of the functionality of a content distribution network is as follows. Suppose a user located at first user store 102, has a profile indicating that he likes new comedy movies. A new comedy movie "Evan Almighty" becomes available, and it therefore rises immediately to near the top of the user's "expected to view" list.

First user store 102 is the user's home media server, which is the first node at which the film might be held. Each node in the network, including the user's home media server, may contain the following: storage capacity for content items held locally on that node; an index to determine if a content item is held locally on that node; and an index to determine where to look for content items not held locally.

First local network store 106 maintains an index specifying where to look for "Evan Almighty" among second user store 104, second local network store 108, and first distant network store 110. Since the content stored at every node changes continuously, an updating protocol is provided to allow nodes to communicate to tell adjacent nodes what content can be reached from or through that node.

The decision about what content is needed is driven by the collective predicted requirements of each user, not just the individual user. Thus, a decision point located either in the network or at a customer location predicts future content requirements for the user and every other customer. The set of required content cascades through the network towards more distant nodes, adding the required content of other subtended users, and subtracting any content already cached at intermediate nodes.

Thus, the network will self-optimize the dispersion of content. In general, items uniquely of interest to a small number of users will be held in user-based stores. Items of general interest within the local served area will be held in local stores. Thus, some local stores will hold sets of items that are quite different from other local stores, for example, based on the ethnicity or languages spoken in the served neighborhood. Items of unique or rare interest that cannot be predicted in advance will be held in the distant store.

Returning to the example, suppose that content distribution network 100 determines that "Evan Almighty" is not stored locally in first user store 102. the user may then obtain a copy from first local network store 106, from another user connected to first local network store 106, such as second user store 104, or from a more distant caching node, such as first distant network store 110.

Content distribution network 100 first looks across communication link 120 to first local network store 106, located at the service provider's local exchange building. Based on the information that "Evan Almighty" will be useful to the user, content distribution network 100 will try to add "Evan Almighty" to a local cache during an off-peak period. These off-peak periods are identified based on capacity information communicated between nodes.

If "Evan Almighty" is of more general interest than just to the user, it may be held at first local network store 106, rather then using capacity of numerous user caches. If many local or user nodes want a copy of the film, local network store 106 may send the movie via multicast or broadcast mode, thereby making it available for many nodes simultaneously.

Once a copy of "Evan Almighty" is stored on a node, it will be stored at the node until the node is full and the movie is displaced by a more useful piece of content. Even then, the new piece of content must be "better" than "Evan Almighty" based on the number of interested users, probability of access, etc. By preventing displacement of content except by "better" content, content distribution network 100 minimizes churn, which occurs when items of similar utility are swapped in and out.

According to the forgoing, various exemplary embodiments use predictive information about future content consumption probability to improve the efficiency of caching at multiple network levels and off-load demand peaks. Thus, various exemplary embodiments improve the cost effectiveness at which personalized content can be delivered to users in a content distribution network.

Although the various exemplary embodiments have been described in detail with particular reference to certain exemplary aspects thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A method for managing content items stored in a content distribution network having a plurality of tiers, the method comprising:

determining, at a first network node, a list of currently cached content items;

creating a list of highest utility content items, the list of highest utility content items structured as a self-organizing hierarchy of rarity based upon a likelihood that users will request content items from the first network node, wherein the content items are respectively cached in the plurality of tiers based upon the likelihood that the users will access the content items, such that content items with high probability of being accessed are cached closer to a user, while rarely accessed content items are stored more centrally at a distant network store;

comparing the list of highest utility content items to the list of currently cached content items;

determining a ranked list of candidates for caching, the ranked list of candidates for caching comprising the content items if the list of highest utility content items that are not in the list of currently cached content items wherein the list of candidates for caching is ranked according to a utility measure of a probability that the selected content item will be accessed; and receiving from a second network node, at the first network node, a selected content item from the list of candidates for caching.

2. The method for managing content items stored in the content distribution network according to claim 1, wherein the content distribution network is one of a unicast, broadcast, switched broadcast, and multicast network.

3. The method for managing content items stored in the content distribution network according to claim 1, wherein the step of determining the list of currently cached content items begins when the first network node identifies a change in a probability of access of the content items.

4. The method for managing content items stored in the content distribution network according to claim 1, wherein the selected content item is a highest ranked content item from the list of candidates for caching.

5. The method for managing content items stored in the content distribution network according to claim 1, further comprising:

a dropping one or more content items when there is insufficient storage on the first network node to store the selected content item.

6. The method for managing content items stored in the content distribution network according to claim 5, wherein the step of dropping the one or more content items occurs only when a combined measure of utility of the one or more content items to be dropped is less than a measure of the utility of the selected content item by a predetermined threshold.

7. The method for managing content items stored in the content distribution network according to claim 1, wherein the step of receiving the selected content item occurs only during an off peak period.

8. The method for managing content items stored in the content distribution network according to claim 1, further comprising;

sending, from the second network node to the first network node, an update providing information regarding the content items currently stored on the second network node.

9. The method for managing content items stored in the content distribution network according to claim 8, wherein the update lists all content items currently stored on the second network node.

10. The method for managing content items stored in the content distribution network according to claim 8, wherein the update lists only dropped items and added items stored on the second network node since a last update to the first network node.

11. A network node for caching content items in a content distribution network having a plurality of tiers, the network node comprising:

a storage part that stores the content items;

a monitoring part that forms a ranked list of candidates for caching, wherein the list of candidates for caching is ranked according to a utility measure of a probability that the selected content item will be accessed, the monitoring part forming the list of candidates for caching by comparing items in a list of highest utility content items structured as a self-organizing hierarchy of rarity, with a list of currently cached content items, wherein the list of highest utility content items indicates a likelihood that users will request the content items and the content items are respectively cached in the plurality in the plurality of tiers based upon the likelihood that the users will access the content items, such that content items with high probability of being accessed are cached closer to a user, while rarely accessed content items are stored more centrally at a distant network store; and a receiving part that receives, from a server network node, a selected content item in the list of candidates for caching.

12. The network node for caching content items in the content distribution network according to claim 11, wherein the content distribution network is one of a unicast, broadcast, switched broadcast, and multicast network.

13. The network node for caching content items in the content distribution network according to claim 11, wherein the storage part drops one or more content items when there is insufficient storage in the storage part to store the selected content item.

14. A network node for distributing content items in a content distribution network having a plurality of tiers, the network node comprising:

a storage part that stores the content items;

a receiving part that receives a download request from a client network node, the client network node forming the download request by comparing items in a list of highest utility content items, structured as a self-organizing hierarchy of rarity, to a list of currently cached content items, and the client network node determining a ranked list of candidates for caching wherein the list of candidates for caching is ranked according to a utility measure of a probability that the selected content item will be accessed, wherein the list of highest utility content items indicates a likelihood that users will request the content items from the client network node and the content items are respectively cached in the plurality of tiers based upon the likelihood that the users will access the content items, such that content items with high probability of being accessed are cached closer to a user, while rarely accessed content items are stored more centrally at a distant network store; and a sending part that sends, to the client network node, a selected content item stored in the storage part, the selected content item identified by the download request.

15. The network node for distributing content items in the content distribution network according to claim 14, further comprising:

an updating part that communicates, to at least one adjacent node, a list of content stored in the storage part and a list of reachable storage nodes.

16. The network node for distributing content items in the content distribution network according to claim 14, wherein the client network node drops one or more content items when there is insufficient storage in the client network node to store the selected content item.

17. A content distribution network for dynamically managing storage of content items in a plurality of tiers, the network comprising:

a first network node, the first network node determining a list of currently cached content items and a list of highest utility content items, the list of highest utility content items structured as a self-organizing hierarchy of rarity, indicating a likelihood that users will request content items from the first network node and the content items are respectively cached in the plurality of tiers based upon the likelihood that the users will access the content items, such that content items with high probability of being accessed are cached closer to a user, while rarely accessed content items are stored more centrally at a distant network store;

a second network node, the second network node storing one or more content items, wherein the first network node determines a ranked list of candidates for caching by comparing items in the list of highest utility content items to the list of currently cached content items, wherein the list of candidates for caching is ranked according to a utility measure of a probability that the selected content item will be accessed, and the first network node receives, from the second network node, a selected content item in the list of candidates for caching.

18. The content distribution network for dynamically managing storage of the content items according to claim 17, wherein the content distribution network is one of a unicast, broadcast, switched broadcast, and multicast network.

19. The content distribution network for dynamically managing storage of the content items according to claim 17, wherein the first network node determines the list of currently cached content items when the first network node identifies a change in a probability of access of one or more content items.

20. The content distribution network for dynamically managing storage of the content items according to claim 17, wherein the selected content item is a highest ranked content item from the list of candidates for caching.

21. The content distribution network for dynamically managing storage of the content items according to claim 17, wherein the first network node drops one or more content items when there is insufficient storage on the first network node to store the selected content item.

22. The content distribution network for dynamically managing storage of the content items according to claim 21, wherein the first network node drops one or more content items only when a combined measure of utility of the one or more content items to be dropped is less than a measure of utility of the selected content item by a predetermined threshold.

23. The content distribution network for dynamically managing storage of the content items according to claim 17, wherein the first network node receives the selected content item only during an off-peak period.

* * * * *

UNITED STATES PATENT AND TRADEMARK OFFICE
CERTIFICATE OF CORRECTION

PATENT NO. : 7,697,557 B2
APPLICATION NO. : 12/003469
DATED : April 13, 2010
INVENTOR(S) : Jonathan Segel Page 1 of 1

It is certified that error appears in the above-identified patent and that said Letters Patent is hereby corrected as shown below:

Column 17, Claim 5, line 4, delete "a";

Column 17, Claim 11, line 15, delete one of the "in the plurality";

Column 18, Claim 17, line 3, insert --content distribution-- before "network".

Signed and Sealed this

First Day of June, 2010

David J. Kappos
*Director of the United States Patent and Trademark Office*